Nov. 22, 1949  E. WOLF  2,489,115
PIN LOCKING DEVICE FOR CASTERED
AIRPLANE MAIN LANDING WHEELS
Filed April 10, 1948

INVENTOR.
Edward Wolf
BY
A. H. Oldham
ATTORNEY

Patented Nov. 22, 1949

2,489,115

UNITED STATES PATENT OFFICE 2,489,115

PIN LOCKING DEVICE FOR CASTERED AIRPLANE MAIN LANDING WHEELS

Edward Wolf, Cuyahoga Falls, Ohio, assignor to Goodyear Aircraft Corporation, Akron, Ohio, a corporation of Delaware Application April 10, 1948, Serial No. 20,258

5 Claims. (Cl. 244—103)

This invention relates to caster airplane main landing wheels and in particular to a device for locking the wheels against castering when parking the airplane.

Heretofore, such devices, usually manually operated, have been known to be used for airplane tail wheels. However, when used for caster main landing wheels, these wheels should be free to caster at a take-off. This is only possible after the caster lock has been manually released. In case, it has been neglected to do so, the main landing wheels will not function properly in crosswind, either at a take-off or at a landing.

It is the general object of the invention to avoid and overcome the foregoing and other difficulties and objections to prior art practices by the provision of an automatic release of the locked main caster wheels of the airplane while riding on the ground at a predetermined speed.

Another object of the invention is to provide means, whereby the caster locking device is automatically released by the air current passing the airplane while riding on the ground at a predetermined speed.

The aforesaid objects of the invention and other objects which will become apparent as the description proceeds are achieved by a locking pin passing axially of the wheel through a part fixed to the wheel hub and extending into the supporting axle of the wheel.

This pin, to prevent it from falling out, is held under spring load in a bayonet socket extending from said wheel part. However, to assure castering of the wheels during the take-off of an airplane the locking pin is provided with an upward extension, at substantially right angle to the axial pin portion, to which is attached a plate, or flag, facing the air flow along the airplane at suitable distance from the wheel axis. In case, it should have been neglected to manually remove the locking pin, then, it will be automatically ejected from its socket as soon as the airplane has reached a predetermined speed at which the wind pressure against the plate will turn the locking pin in its socket for release. The ejected pin, then, is picked up from the ground to be given back to the airplane after its return.

Figure 1:
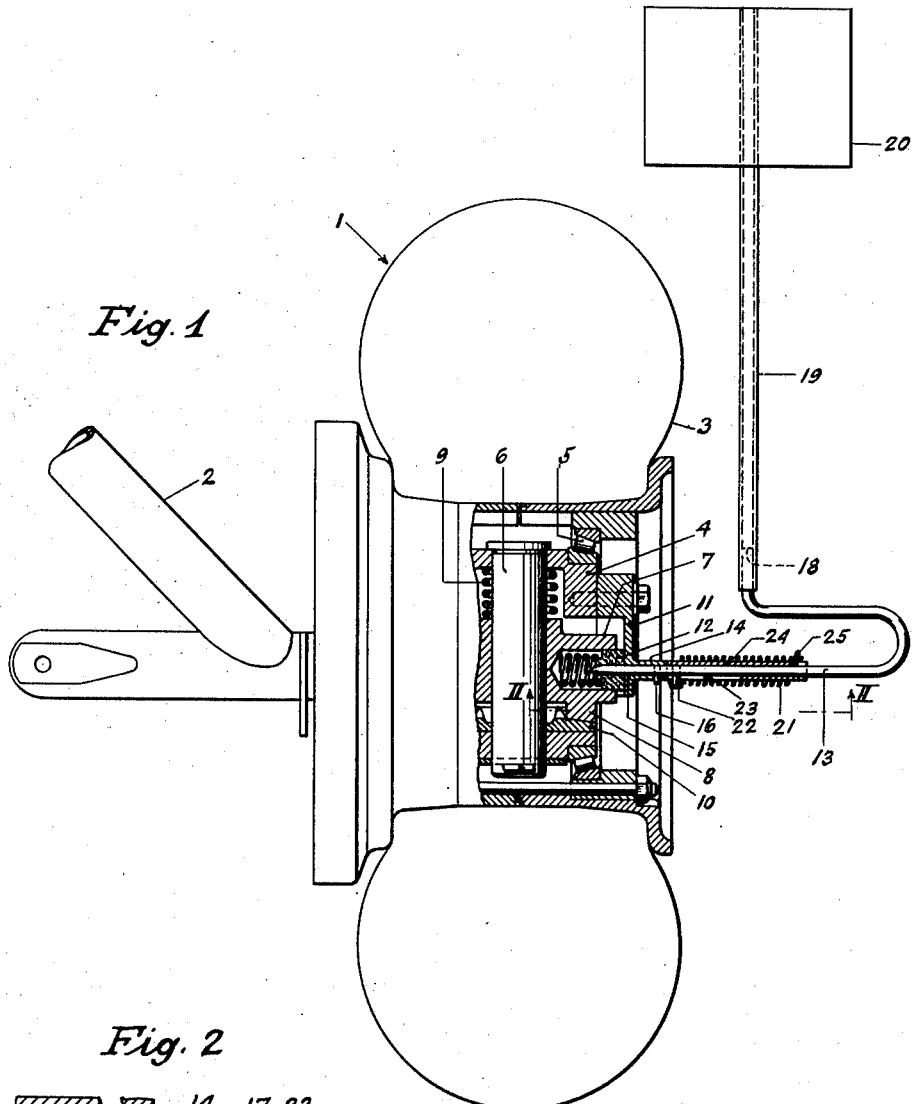
Figure 2:
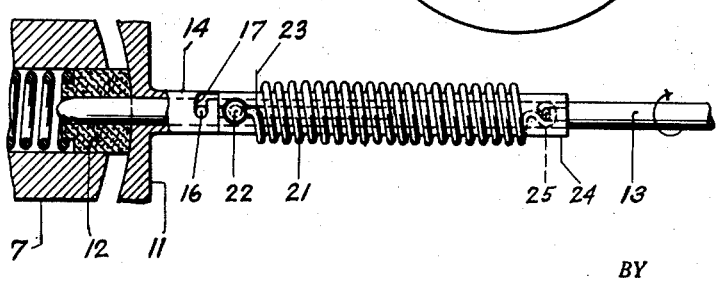

For a better understanding of the invention reference should be had to the accompanying drawings, wherein:

Fig. 1 is a front view, partially shown in cross-section, of one embodiment of the invention, and Fig. 2 is a fragmentary bottom view taken on line II—II of Fig. 1.

With specific reference to the form of the invention illustrated in the drawing, the numeral 1 indicates, in general, a caster airplane landing wheel mounted on the under carriage structure 2. The wheel, including a rubber tire 3, being rotatable about a hollow hub 4 carrying bearings 5, and also swingable about a king pin 6 inserted at right angle and slidable in an axle 7 extending from the undercarriage structure 2. The axle 7, passing with sufficient side and upward clearance through the hub 4, is provided with cam followers 8 seated in frictional relation under pressure of spring 9 on the centering cam 10 which tends to keep the wheel in neutral position. A brake 11 attached to the hub 4 cooperates with the spring loaded friction block 12 inserted in the end of the axle 7 to dampen minor wheel vibrations.

For locking the wheel 1 against undesired castering, a pin 13, inserted in a guide 14, fixed to the brake 11, attached to the wheel hub 4, extends through a hole 15 in brake 11 and through the friction block 12 in the fixed axle 7. The locking pin 13 is provided with a retaining pin 16 fixed therein which cooperates with a bayonet slot 17 cut into the pin guide 14, and its outer portion 18 is bent to assume with its axial portion a radial position and carries an extension arm 19 to the outer end of which is attached a plate or flag 20 with its face placed transversely to the air flow. To hold the pin 13 in locking position the arresting pin 16 is kept under load in the bayonet slot 17 by a spring 21 which is attached at one end to a holding pin 22 fixed in the locking pin 13 and slidable in a slot 23 of sleeve 24 butting against the end face of the guide 14 and surrounding the pin 13, whereas, its other end is attached to a bent-up tab 25 on the sleeve 24. This arrangement fulfills the purpose of securely locking the wheel against caster action and also permits automatic release of the locking pin when castering of the wheel is desired. The latter function is obtained when in taxiing an airplane assumes sufficient speed, approximately twenty miles per hour, whereby the wind force hitting the plate 20 will turn the locking pin 13 in the direction of the arrow into position for its release from the bayonet slot 17, by the tension of the spring 21 at a predetermined rolling speed of the airplane.

From the foregoing description it will be understood that the objects of the invention have been achieved in a very simple, inexpensive and practicable way which avoids the danger of caster wheels in taxiing or landing an airplane being locked, because of omission to manually remove the locking pins before taking-off. The plate or flag also is a visible reminder for unlocking the wheels.

While in accordance with the patent statutes one best known embodiment of the invention has been illustrated and described in detail, it is to be particularly understood that the invention is not limited thereto or thereby, but that the inventive scope is defined in the appended claims.

I claim:

1. In combination with an airplane landing gear, a pair of castering landing wheels, an axle about which said wheels turn, a king pin for each wheel substantially at a right angle to the axle for castering the wheels, a locking pin to prevent castering movement of the wheels, and air-operated means for releasing said locking pin at a predetermined ground speed of the airplane, said last-named means and the locking pin being capable of being picked off by hand prior to take-off and stowed in the airplane to release the wheels for castering.

2. In combination with an airplane landing gear, a pair of castering landing wheels, an axle about which said wheels turn, a king pin for each wheel substantially at a right angle to and adjacent the ends of the axle for castering the wheels, a locking pin to prevent castering movement of the wheels, and air-operated means for releasing said locking pin at a predetermined ground speed of the airplane.

3. In combination with an airplane landing gear, a pair of castering landing wheels, an axle about which said wheels turn, a king pin for each wheel substantially at a right angle to the axle for castering the wheels, a locking pin to prevent castering movement of the wheels, and air-operated means for releasing said locking pin at a predetermined ground speed of the airplane, said air operated means and locking pins being constructed and arranged to drop off of the airplane after they have released the wheels for castering.

4. In combination with an airplane main landing gear, a fixed axle, a king pin inserted diametrically adjacent each end of said axle, a hollow hub swingable about said king pin, a landing wheel rotatable about said hub, an axial guide attached to the outer end of said hub being provided at its outer end with a bayonet slot, a spring loaded, releasable locking pin for arresting swingable movement of the wheel about the king pin being inserted in said guide and extending into said axle to be held in said slot, and a plate spaced from the axial portion of the locking pin and attached to an extension radial thereto, said locking pin keeping said wheels locked against castering at parking speed, but being released from said bayonet socket at a predetermined forward speed of the airplane by the wind pressure against said plate.

5. In combination with an airplane main landing gear, a fixed axle, a king pin at right angle to and adjacent each end of said axle, a landing wheel including a hub castering about said king pin and said wheel being rotatable about the hub, a bayonet socket extending axially from said hub, a pin inserted in said socket and reaching into said axle for locking the wheel to the axle against castering, a spring for holding the pin in place, said locking pin having a portion extending radially of the wheel, and a plate facing the air flow and disposed a suitable distance from the wheel center being attached to said radial portion of the locking pin to re-establish castering of the wheel by turning the pin, in said socket by means of the air flow pressure against the plate at a predetermined airplane speed and ejecting it by the spring tension.

EDWARD WOLF.

REFERENCES CITED

The following references are of record in the file of this patent:

UNITED STATES PATENTS

| Number | Name | Date |
|---|---|---|
| 1,832,159 | Vanderlip | Nov. 17, 1931 |
| 2,071,884 | Levy | Feb. 23, 1937 |
| 2,229,384 | Mercier | Jan. 21, 1941 |
| 2,351,935 | Devlin | June 20, 1944 |